United States Patent [19]

Dementhon et al.

[11] Patent Number: 5,297,061

[45] Date of Patent: Mar. 22, 1994

[54] THREE DIMENSIONAL POINTING DEVICE MONITORED BY COMPUTER VISION

[75] Inventors: Daniel F. Dementhon, Columbia, Md.; Yukio Fujii, Yokohama, Japan

[73] Assignee: University of Maryland, College Park, Md.

[21] Appl. No.: 63,489

[22] Filed: May 19, 1993

[51] Int. Cl.⁵ .............................................. G06F 15/62
[52] U.S. Cl. .................... 364/559; 364/516; 345/156
[58] Field of Search ........... 364/559, 514, 516, 424.02; 340/706

[56] References Cited

U.S. PATENT DOCUMENTS

| | | | |
|---|---|---|---|
| 4,649,504 | 3/1987 | Krouglicof et al. | 364/559 |
| 4,672,562 | 6/1987 | Egli et al. | 364/559 |
| 4,672,564 | 6/1987 | Egli et al. | 364/516 X |
| 4,685,054 | 8/1987 | Manninen et al. | 364/559 X |
| 4,864,515 | 9/1989 | Deck | 364/516 |
| 4,933,864 | 6/1990 | Evans, Jr. et al. | 364/559 X |
| 4,942,538 | 7/1990 | Yuan et al. | 358/101 X |
| 4,956,794 | 9/1990 | Zeevi et al. | 364/559 |
| 5,128,794 | 7/1992 | Mocker et al. | 364/514 X |
| 5,208,763 | 5/1993 | Hong et al. | 364/559 X |
| 5,227,985 | 7/1993 | Dementhon | 340/706 X |

OTHER PUBLICATIONS

Meyer et al. "A Survey of Position Trackers", Presense, vol. 1, No. 2, Spring 1992, pp. 173-200.

*Primary Examiner*—Kevin J. Teska
*Attorney, Agent, or Firm*—Christopher N. Sears

[57] ABSTRACT

A pointing device (28), comprising light sources (30) and monitored by a computer vision task running in a microcontroller (108) and a computer (24). The computer vision task computes the spatial position and orientation of the pointing device, and enables an operator to control virtual three dimensional objects (73) on the display (22) of the computer. Images (78) are captured by a video camera (20) and digitized, and only image rows that contain bright pixels (80) from the light sources are processed. The light sources are the tips of optic fibers (30) guiding light from a laser diode (32), and an optical filter (46) on the camera is matched to the wavelength of the laser diode.

13 Claims, 9 Drawing Sheets

THREE DIMENSIONAL POINTING DEVICE MONITORED BY COMPUTER VISION

The United States Government has rights to this invention pursuant to ARPA Order No. 6989 from the Advanced Research Project Agency.

FIELD OF THE INVENTION

This invention relates to a pointing device comprising light sources, which enables an operator to control virtual three dimensional objects on the display of a computer. A computer vision system monitors the pointing device, computes its spatial position and orientation, and the appearances of the virtual three dimensional objects on the computer display are modified accordingly.

BACKGROUND OF THE INVENTION

There is presently considerable interest in systems able to track the position and orientation of an object in space. In particular, these systems are being applied to virtual reality technology, in which the user interacts with a computer by moving a hand or the head to control a computer-generated world. The paper "A Survey of Position Trackers", by K. Meyer, H. Applewhite and F. Biocca, in Presence, vol. 1, number 2, Spring 1992, pp. 173-200, MIT Press, provides a survey of such technologies. Position tracking has been implemented using four different approaches: electro-optical, mechanical, magnetic, and acoustic. Electro-optical position trackers have received more attention than the other systems. They typically use video cameras to detect bright points of the tracked object, and compute, from the locations of these points in video frames, the six degrees of freedom of the object. For example, this paper mentions an electro-optical head position sensor described in U.S. Pat. No. 4,956,794 to Zeevi et al., entitled "Single Camera Three Dimensional Head Position Sensing System". At least three cues able to reflect light from a separate source are mounted along an imaginary circle around the head of the operator, and are detected in the video stream from a single camera. The locations of the images of these cues are claimed to contain enough information to provide indication of head rotation and translation at video frame rate. A close examination reveals, however, that the electronic circuitry disclosed in Zeevi is designed to detect only the rising edges created by the images of these cues in the video signal. Such an approach is only useful if the cues are relatively far from the camera and are seen as very small dots. When the cues are close to the camera, it would be more desirable to compute the centroids of the images of the cues. This computation would require detecting both the rising edges and the falling edges created by images of bright spots in the video signal, and integrating the information about such edges from all the rows of the video image occupied by the same bright spots. By detecting only rising edges in the video signal, a system as taught by Zeevi et al. cannot accurately detect the positions of the images of the cues when they are relatively close to the camera.

In U.S. Pat. No. 4,672,562, issued to Egli et al., entitled "Method and Apparatus for Determining Location and Orientation of Objects", a method and apparatus are taught in which target points are mounted along orthogonal lines on the object, and the coordinates of the image spots created by these target points on the image plane of the camera are detected on the image plane. Computations using these coordinates provide spatial information about the object. However, Egli et al. do not teach any of the hardware requirements for detecting these image spots.

In U.S. patent application Ser. No. 07/998470 and U.S. Pat. No. 5,227,985 disclosed by one of the present inventors, systems are described which use a single camera with at least four light sources in any noncoplanar arrangement mounted on the object. The systems are able to compute the position and orientation of the object from the bright spots created by the light sources in the image of the camera with very simple computing steps even when the number of light sources is large and in a complex arrangement. This task requires digitizing analog video data from an NTSC video signal, and grouping contiguous bright pixels in order to find the centers of the bright spots which are the projections of the light sources in the image. In order to accurately represent these bright spots, around 256 digital pixels must be obtained for each image row. Since each image row is transmitted out of the camera in around 50 $\mu$s of NTSC signal, a new pixel has to be digitized approximately every 200 nanoseconds. Instructions for a typical inexpensive microprocessor running at 33 MHz takes from 300 to 600 nanoseconds, therefore there is not enough time for such a microprocessor, while the pixels are being digitized, to find the strings of bright pixels in an image row. Finding the strings of bright pixels while the pixels are being digitized would require relatively expensive hardware. The present invention teaches how to implement a system which provides the desired output with inexpensive components, by delaying the search for such strings of bright pixels to the end of each image row, or to the end of each image field—during the 1200 $\mu$s of vertical retrace between 2 image fields.

SUMMARY OF THE INVENTION

The object of this invention is to disclose hardware improvements for pose monitoring computer vision systems such as in U.S. Pat. No. 5,227,985 U.S. patent application Ser. No. 07/998470, or other pose monitoring computer vision systems.

In one embodiment of the invention, all the pixels from an image field are stored in memory as they are being digitized, and are read again in order to find the centers of groups of bright spots during the vertical retrace period of the NTSC signal. While this storage task occurs, a hardware component keeps checking on each row for occurrences of bright pixels, and if no bright pixel is encountered, stores a flag indicating that the row is empty. When all the pixels for an image field have been stored in memory, the task for finding centers of bright spots is started while the vertical retrace part of the NTSC video signal is being received. This task reads the flags for each image row, and if a flag indicates that a row does not contain any bright pixels, it immediately skips to the next row, thereby saving time to the point that it can be completed before the start of a new image field. In a variant of this embodiment, the flag-making function and the spot center detection function can be turned on or off by the user. When these functions are turned off, the hardware has the function of a frame grabber and sends the raw image to the computer display. This frame grabber function allows the user to display raw images such as they are seen by the camera. These raw images can be used for the visual diagnostic by the user of problems such as the presence of foreign light sources in the field of view of the camera which may be confused with light sources of the 3D pointing device.

In another embodiment of the invention which accommodates a smaller data storage space, only the addresses of the transitions between dark and bright pixels are stored in memory. The spot center detection task accesses this memory at the end of an image row, or at the end of an image field. With a microprocessor running at high frequency, the memory content can be read by the processor and processed during the scanning back period of each of the image rows.

Each of these embodiments can be provided a variable threshold function for the detection of the bright pixels. When the light sources are located far from the camera, only 2 or 3 pixels may be visible in each of the image spots. Any further increase of distance may make the spots disappear completely from the image. When the light sources are close to the camera, the light spots may grow very big, with an increased risk of overlapping. To avoid these occurrences, a negative feedback loop is implemented between the number of bright pixels and the detector of bright pixels, whereby the detector of bright pixels is given a lower threshold when the number of bright pixels is low, and a higher threshold when the number of pixels is high.

In another embodiment of the invention, the light sources of the pointing device are the tips of optic fibers which guide light from a primary light source located inside the handle of the pointing device and created by an incandescent light bulb, a light emitting diode or a laser diode.

In yet another embodiment of the invention, the position of the cursor displayed on the computer screen is computed from the pose of the 3D pointing device in such a way that when the user reaches a boundary of the camera field of view, the cursor reaches the edge of the computer screen. The user can then easily avoid moving the 3D pointing device out of the field of view of the camera.

OBJECTS AND ADVANTAGES OF THE INVENTION

Accordingly, several objects and advantages of the present invention are:

(a) To provide a system in which the light sources are the tips of optic fibers transmitting light from a primary light source;

(b) To provide a system composed of a single electronic camera providing images in the form of analog video data, a 3D pointing device used for interfacing with a computer and supporting an arrangement of light sources, a computing task for detecting the centers of the bright spots created by the light sources in the camera images, and computing tasks for matching the bright spots to their corresponding light sources and for computing the pose of the pointing device from the image positions of the bright spots, in which the computing task for detecting the centers of the bright spots includes 2 phases, (1) a writing phase in which all pixels are stored in memory, and rows of pixels which do not contain bright pixels are marked by a flag, (2) a reading phase in which the bright pixels are detected among the pixels of rows without flags, while all rows with flags are skipped in order for the spot center detection task to be completed during the vertical retrace period before the next video image;

(c) To provide a system in which the memory storage for the pixels can be switched to a frame grabber mode for display on the computer screen and visual detection by the user of possible foreign confusing light sources;

(d) To provide a system in which only the row and column positions of the transitions between dark and bright pixels are stored in memory, and all other pixel information is discarded, resulting in a very small memory storage requirement, and the spot center detection task accesses this memory during the vertical retrace period before the next video image;

(e) To provide a system in which only the column positions of the transitions between dark and bright pixels are stored in memory, and the spot center detection task uses a a faster microprocessor to access this memory during the scan back period before each next row, resulting in an even smaller memory storage requirement;

(f) To provide a system in which a negative feedback loop is implemented between the number of bright pixels and the detector of bright pixels, whereby the detector of bright pixels is given a lower threshold when the number of bright pixels is low, and a higher threshold when the number of pixels is high, so that the size of bright spots in the image is kept approximately constant independently of the distance of the pointing device to the camera;

(g) To provide a system in which a cursor is displaced on the display of a computer in response to the motions of the 3D pointing device, and reaches the edges of the display when the 3D pointing device reaches a boundary of the field of view of the camera, so that the user can easily avoid moving the 3D pointing device out of the camera field of view. Still further advantages will become apparent from a consideration of the ensuing description and drawings.

REFERENCE NUMERALS IN THE DRAWINGS

Figure 1:
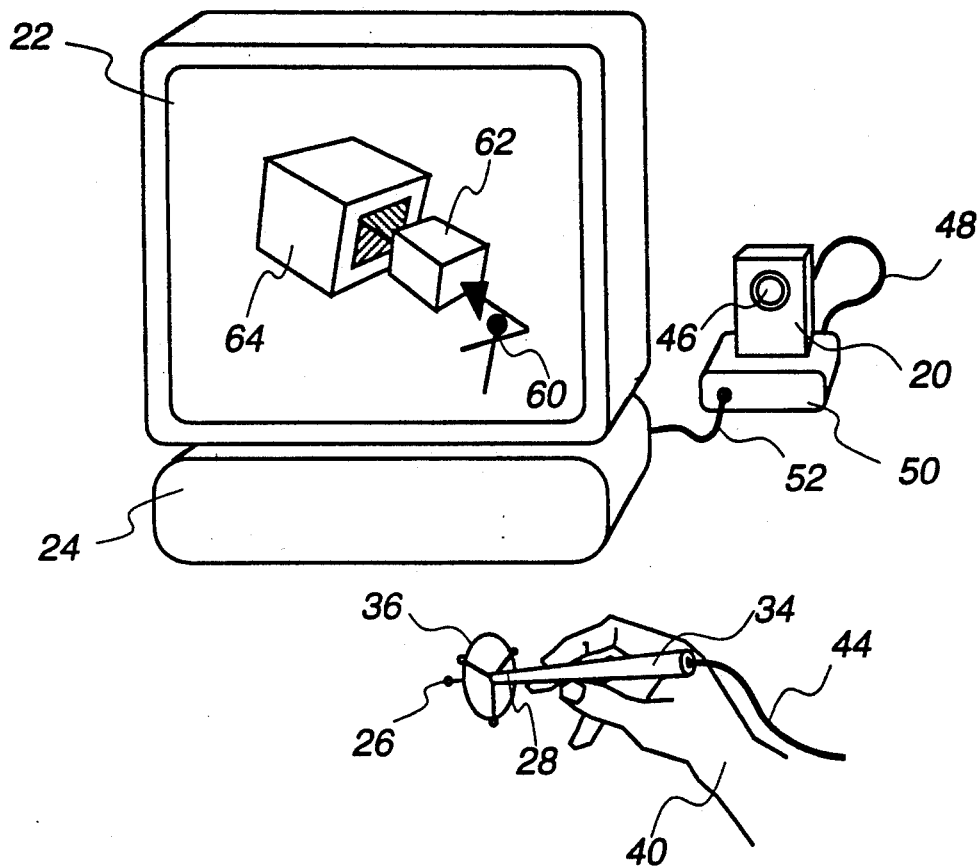
FIG. 1 shows the components for a pointing device system using computer vision according to the invention.

| REFERENCE NUMERALS IN THE DRAWINGS | |
|---|---|
| 20 Video camera | 22 Computer display |
| 24 Computer | 26 Light sources |
| 28 Pointing device | 30 Light guide |
| 32 Main light source | 34 Handle |
| 36 Frame | 38 Batteries |
| 40 User's hand | 42 Switch |
| 44 Power cable | 46 Optical bandpass filter |
| 48 Video cable | 50 Spot Detecting Unit |
| 52 Data cable | 60 Screen Cursor |
| 62 Cuboid peg | 64 Block |
| 66 Camera optical axis | 70 User's point of view |
| 72 User's image plane | 73 Virtual 3D block |
| 74 Camera nodal point | 76 Camera image plane |
| 78 Thresholded image | 80 Bright spot |
| 82 Virtual 3D cursor | 86 Camera focal length |
| 88 CCD rectangle | 90 Boundaries of camera field of view |
| 92 User's focal length | 94 User's window of view |
| 96 Boundaries of user's field of view | 101 Scanning back period |
| 102 A/D Converter | 103 Clock Generator |
| 104 Address Counter | 105 Spot Level Detector |
| 106 Sync Detector | 107 Flip-flop |
| 108 Microcontroller | 110 Data Bus Selector |
| 111 Address Bus Selector | 112 Additional Data Bus Selector |
| 113 Edge Detector | 114 FIFO Memory |
| 115 Write Enable Selector | 117 Blank Line Flag |

DETAILED DESCRIPTION

FIG. 1 illustrates an embodiment of the whole user—computer interface system. Camera 20 is positioned next to computer display 22 of computer 24 and faces the user. Several light sources 26 are attached to pointing device 28. Light sources 26 may be constituted of very small incandescent light bulbs which are known to emit a large proportion of their radiations in the infrared range. Light sources 26 may also be constituted of light emitting diodes (LEDS) or laser diodes emitting principally in the infrared range.

Figure 2:
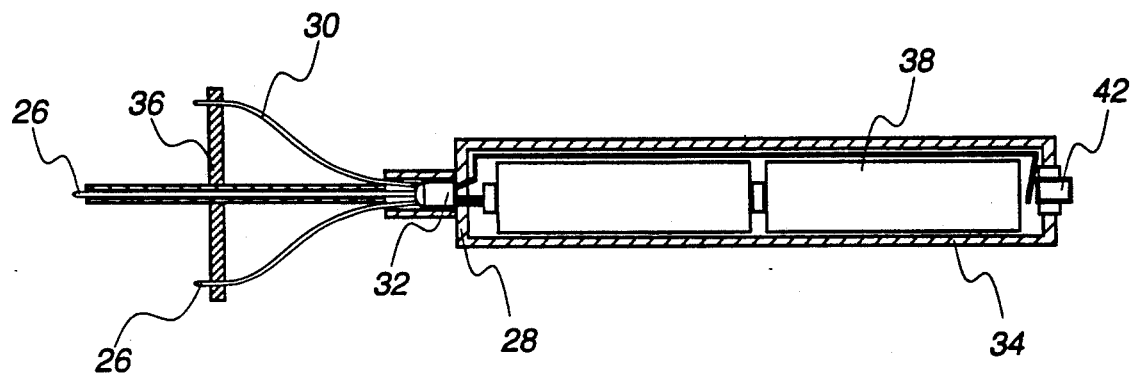
FIG. 2 shows a pointing device using optic fibers.

In the embodiment of FIG. 2, light sources 26 are the tips of flexible transparent light guides 30 such as optic fibers that transmit the light from a main light source 32 hidden inside the handle 34. In this case, the main light source itself may be an incandescent light bulb, a LED or a laser diode. Light guides 30 are held in place by frame 36. Batteries 38 that power the light sources are contained in handle 40. A switch 42 is used to turn the power on or off.

Referring again to FIG. 1, electric power can also be brought to pointing device 28 by a power cable 44. Light sources 24 emit light principally in the infrared range instead of the visible light range, therefore the sensing array for camera 20 may be chosen to be more sensitive to infrared light than to visible light, so that the response of the camera array to the light sources is large in comparison to the response to background light, and so that the spots created by the light sources in the image are much brighter than the background even when the user works in ambient light. To increase this desirable effect, an optical bandpass filter 46 is mounted in front of the lens of camera 20 to selectively transmit wavelengths emitted by the light sources 26 of pointing device 28 and block wavelengths transmitted by the background scene. Frame 36 which supports light sources 26 is composed in part of thin and/or transparent material in order to reduce the chances for the frame to occlude the light sources from the camera's view.

A video cable 48 transmits the video signal from the camera to a Spot Center Detecting Unit 50, which analyzes the camera images coded in the video signal and detects the image coordinates of the centers of the bright spots created by the light sources. These coordinates are transmitted by data cable 52 to main computer 24, where the computation of the position and orientation (the "pose") of pointing device 28 repeatedly takes place at small time intervals. Alternatively, this computation could have taken place inside a separate microprocessor in a box outside the main computer, in which case the parameters describing the pose of the pointing device would be transmitted to main computer 24 through data cable 52. A screen cursor 60 is shown on the computer display among perspective views of 3D objects, a cuboid peg 62 and a block 64. Screen cursor 60 is the perspective projection of a virtual 3D cursor of known 3D structure that is assumed to move along pointing device 28. In the illustration of FIG. 1, the virtual 3D cursor is a stick figure of a man with a spherical head holding in his right hand an arrow that is perpendicular to the plane of his object and points in front of him. Screen cursor 60 is obtained from the virtual 3D cursor by the same perspective projection that is used for the other 3D objects of the virtual 3D scene represented on the computer display. In the drawing, the user has attached the cursor to cuboid peg 62, and is inserting this peg into the rectangular hole of block 64.

Figure 3:
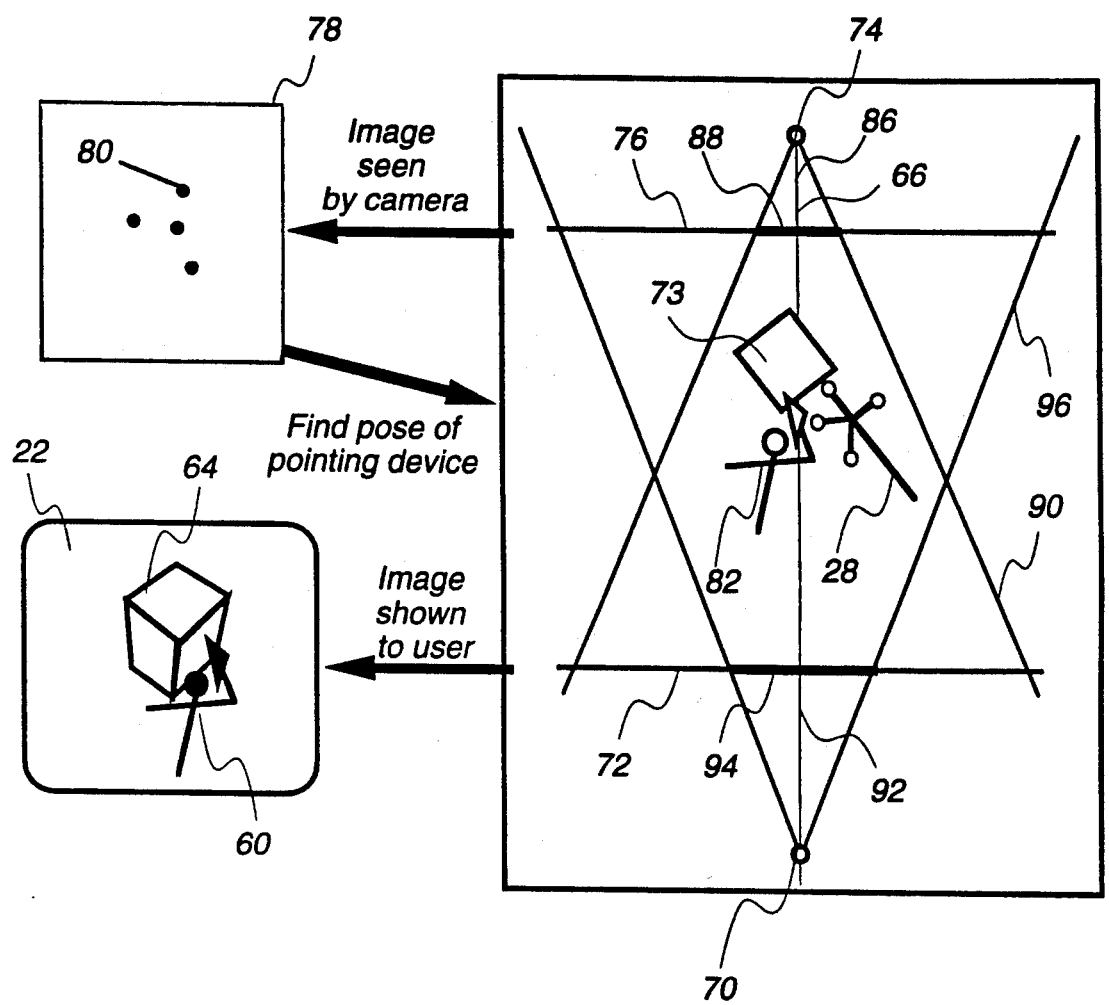
FIG. 3 illustrates the operations performed by the system in order to display a screen cursor which follows the motions of a pointing device.

FIG. 3 further illustrates the operations that relate the pose of the pointing device in front of the camera to the display of screen cursor 60 and to the displacements of 3D objects on the computer display 22. Perspective views of 3D objects on computer display 22 such as block 64 are obtained by the following method. The user's point of view 70 is a point defined at a distance of approximately 1 meter in front of the camera 20, and user's image plane 72 is perpendicular to the line joining the camera to user's point of view 70. A virtual 3D block 73 is positioned in the space in front of the user's point of view. A perspective projection of the virtual 3D block from the user's point of view is computed, which is constructed from the intersections of the lines of sight—from the user's point of view to characteristic features such as cube vertices—with the user's image plane 72. This perspective projection is then drawn on the computer screen as block 64. Refinements such as shading, shadows, etc, can also be computed and displayed to provide the user with a more realistic impression. FIG. 3 also shows the position of the actual pointing device 28 as the user positioned it in the space in front of him. The camera faces the user, and the position in space of the camera nodal point 74 and camera image plane 76 are known. The thresholded image 78 seen by the system is shown on the left. It is entirely dark, except for the bright spots 80 that are the images of the light sources 26 of pointing device 28. These spots are at the intersection of the lines of sight from the camera nodal point to the light sources with the camera image plane. The background does not appear in the image because of the optical bandpass filter in front of the camera lens and because of the specific sensitivity of the camera CCD array. Also, a thresholding operation is performed in the Spot Center Detection Unit. This unit finds the x and y coordinates of the bright spots. From these coordinates and the knowledge of the geometric configuration of the light sources on the pointing device, the system can compute the pose of the pointing device in space. The system can then position a virtual cursor 82 at the same pose. The system can then compute a perspective view 84 of virtual cursor 82 by exactly the same operation used for computing the perspective view 64 of virtual 3D block 73. As a result the cursor on the screen will look closer when the user brings the pointing device closer to his eyes. Furthermore, the system can check whether virtual cursor 82 collides with virtual block 73 in space, for example by computing whether one point of the virtual cursor is located inside the geometric volume defining the block. If this is the case and the user expresses his wish to move the virtual cube (for example by clicking on a button located on the handle of the pointing device), the virtual cube is assumed to become connected to the pointing device, so that every change of pose of the pointing device results in the same change of pose of the block. This change of pose of the block results in a displacement of the view 64 of the block on the computer screen, which gives the user the impression that he is displacing the 3D block with the pointing device.

When the user moves the pointing device out of the field of view of the camera, some of the bright spots will disappear from the image, and the system cannot find the pose. Then the cursor on the screen cannot be redrawn in response to user's motions. This event is called an Out of Field Event in the following text. It is very desirable that the user be able to detect from the display when he is about to move the pointing device out of the camera field, so that he can easily avoid such occurrences. Still referring to FIG. 3, the camera field of view is the pyramidal region of space defined by the nodal point 74 of the camera, the focal length 86 of the camera, and the rectangle 88 of sensitive surface of the CCD. These geometric elements define the boundaries 90 of the camera field of view. An Out of Field Event occurs when one light source of the pointing device crosses a boundary of the camera field of view. Similarly, the user field of view is the pyramidal region of space defined by the user's point of view 70, the user's focal length 92, and the user's window of view 94 which corresponds to the view displayed on computer display 22. These geometric elements define the boundaries % of the user's field of view. When the pointing device crosses a boundary of the user's field of view, a part of screen cursor 60 disappears from the edge of the computer display. We call such an event an Out of Screen Event. Out of Screen Events do not create problems in the computing of the pose, and they are predictable and avoidable in the sense that the user can move the pointing device in order to keep the cursor within the screen boundaries. Note that without further computing adjustment, Out of Field Events would not generally occur at the same time as Out of Screen Events: when the pointing device is close to the camera, it would reach a boundary of the camera field of view before reaching a boundary of the user field of view, and the user who looks at the screen would be surprised to find that the cursor is still far from the screen edges and cannot be displaced toward the edge. When the pointing device is far from the camera, it would reach a boundary of the user's field of view much before reaching a boundary of the camera field of view. Then the screen cursor would reach the edge of the screen while the user could have pursued his hand motion further without problems. In the preferred embodiment of this invention, the Out of Field Events and the Out of Screen Events are made to coincide, so that the user is given a direct feedback of an Out of Field Event by seeing that the cursor reaches the edge of the screen, and is thereby warned not to move the pointing device out of view of the camera. This is achieved by multiplying the translation of the virtual 3D cursor 82 with respect to the actual spatial pointing device position, so that the virtual 3D cursor reaches a user field boundary when the pointing device reaches a camera field boundary. In other words, the translation of pointing device 28 is mapped to a different translation of virtual 3D cursor 82 which is amplified when the pointing device is close to the camera, and reduced when the pointing device is far from the camera.

Figure 4:
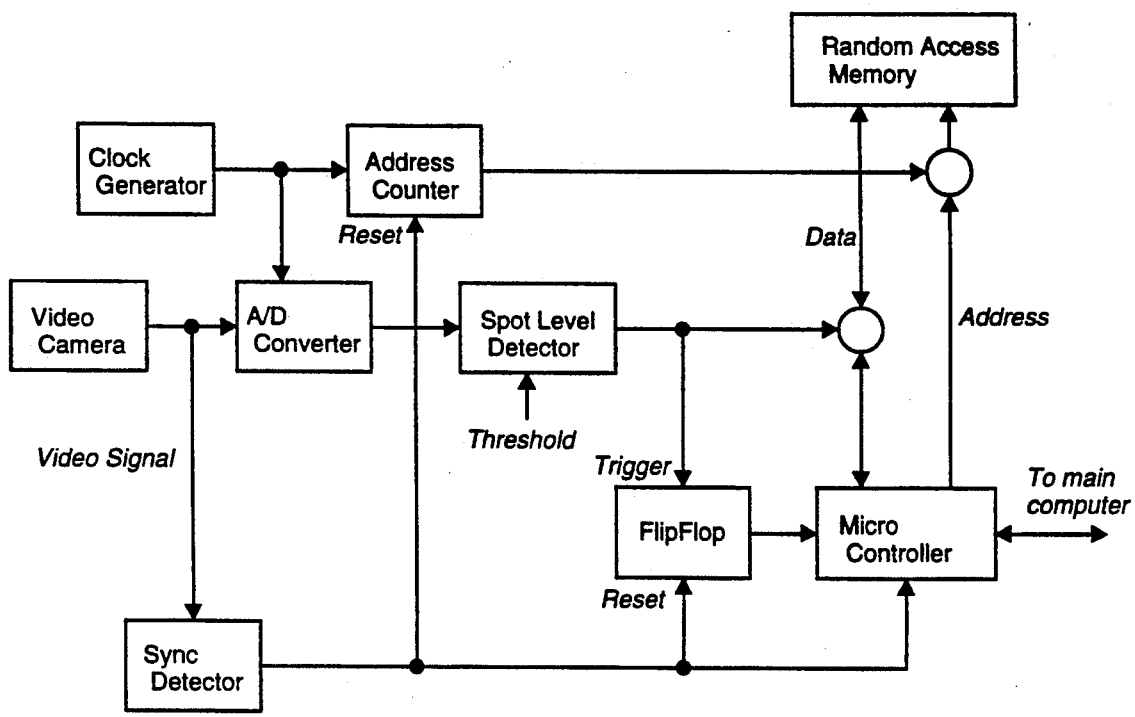
FIG. 4 is a diagram of of the Spot Center Detecting Unit, whose function is to find the centers of bright spots created in the camera images by the light sources of the pointing device.
Figure 5:
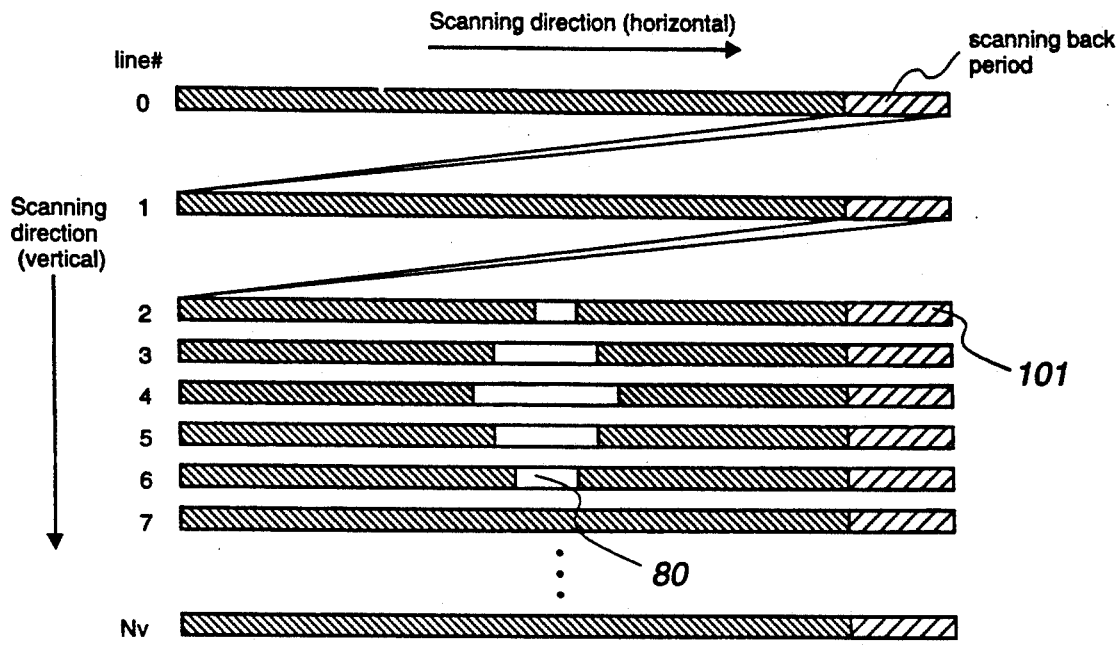
FIG. 5 shows the structure of images from the video camera.

FIG. 4 shows an embodiment of the spot center detecting apparatus. The input is a NTSC (National Television System Committee) video signal captured by video camera 20. The video signal that is output by video camera 20 consists of a sequence of video fields sampled at a frequency fv (fv=59.94 Hz in NTSC). Each video field consists of Nv horizontal scanning lines (Nv=262.5 in NTSC). FIG. 5 is a schematic of a video signal corresponding to an image containing a single bright spot. As shown, a scanning back period, which contains the horizontal synchronize timing pulse (Hsync), is added to each line. This scanning back period lets a monitoring device reproducing the image such as a TV know that the line has ended, and its electron beam is given time to be scanned back to the next line.

Referring again to FIG. 4, video camera 20 provides this video signal to A/D Converter 102 and Sync Detector 106. A/D converter 102 digitizes the video signal from analog to digital form, and sends the digitized signal to Spot Level Detector 105. The sampling rate in this digitizing process is determined by the clock signal generated by Clock Generator 103. This rate defines the horizontal resolution or number of pixels (Nh) on each line and must be chosen at least as high as the number of lines in the image (vertical resolution Nv) for an accurate pose calculation. The clock signal also drives Address Counter 104, which generates the address number corresponding to each pixel. The output of Sync Detector 106, Hsync, resets this counter to zero at every beginning of a line. Spot Level Detector 105 picks up a pixel from a bright spot by comparing the input signal with its threshold level. The output, called pixel data in the following text, becomes a logical high level voltage when the pixel level is greater than the threshold, and remains at a logical low level voltage otherwise. Random Access Memory (RAM) 109 stores the pixel data via Data Bus Selector 110 in its memory cell which is pointed by the address number, the output of Address Counter 104 via Address Bus Selector 111. The data bus and the address bus to RAM 109 are also connected to Microcontroller 108 via Data Bus Selector 110 and Address Bus Selector 111 respectively. Microcontroller 108 has its programmed instruction sets and data sets stored in either internal or external Read Only Memory (ROM) and operates according with these instruction sets. In this apparatus, Microcontroller 108 can fetch the pixel data from RAM 109 or write data to RAM 109 by switching both Data Bus Selector 110 and Address Bus Selector 111, and generating the address number of its target memory cell. By the use of the data from ROM, RAM and other signals from/to Input/Output-(I/O) ports, Microcontroller 108 controls the memory operation, computes the positions of the spot centers and transmits the results to the main computer. In the main computer, a pose calculation combines the positions of the spot centers with a precomputed matrix characterizing the geometry of the light sources to compute the pose (rotation matrix and translation vector) of the arrangement of light sources attached to the pointing device. This pose information is then applied to display on the computer screen a new perspective view of the 3D cursor 94, which thereby follows the motions of the user. This cursor is used by the user to interact with a scene displayed on the screen, as shown in FIG. 1 and FIG. 2.

Figure 6:
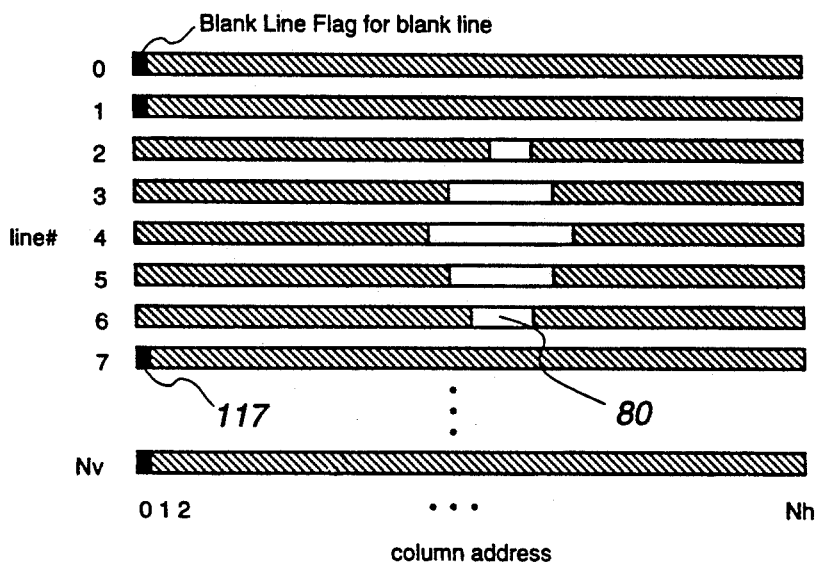
FIG. 6 shows how a Blank Line byte is overwritten to memory when the pixel data of a line do not contain any bright pixels.
Figure 7:
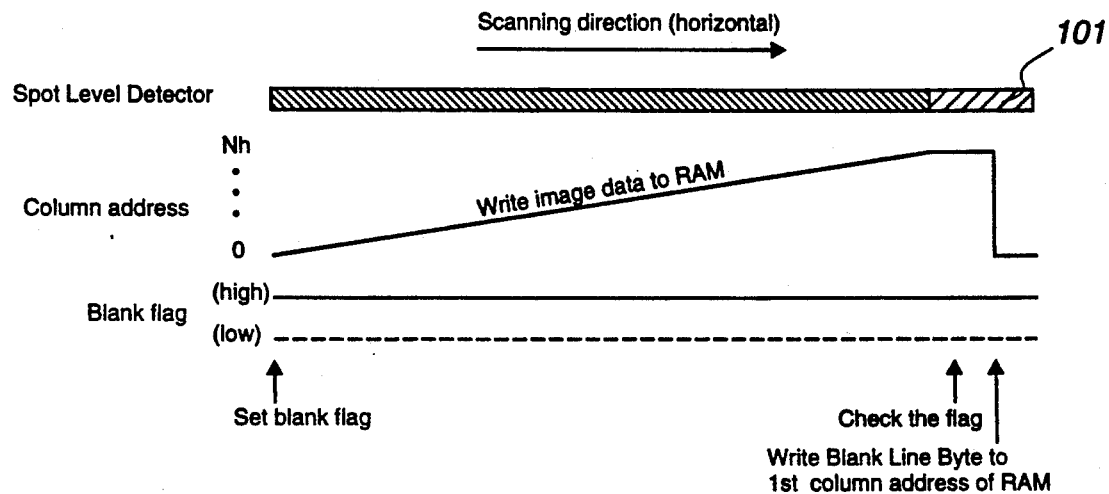
FIG. 7 illustrates the process by which data and a Blank Line byte are written to memory when there are no bright pixels in an image line.
Figure 8:
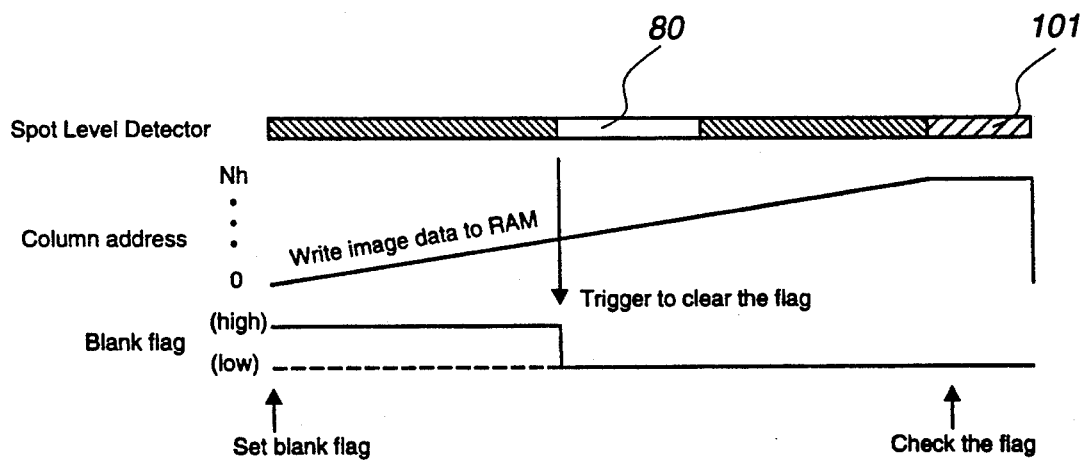
FIG. 8 illustrates the process by which data are written to memory when bright pixels are detected in an image line.

To compute the positions of the spots with the parts described so far, Microcontroller 108 in FIG. 4 would have to recall all the pixel data in RAM 109 by scanning the memory cells pixel by pixel, which would take most of the operating tune in the system operation and cause a serious delay in the response of cursor 94 to the user. Since accessing the memory is a major bottleneck in the operation of many other computer systems, several techniques are implemented to reduce the amount of data flow to and from the memory through the data bus. In the embodiment of FIG. 4, this problem is solved by taking advantage of the characteristics of the image. As mentioned in relation to FIG. 1, an optical bandpass filter 46 blocks most of the light wavelengths that are outside the range of the wavelengths produced by the light sources of the pointing device. Hence the image seen by video camera 20 contains mostly the bright spots that are the images of the light sources on a dark background, as shown on the top left of FIG. 2. Therefore a scanned image contains many blank lines, as shown in FIG. 5. In finding the positions of bright spots, only the lines which contain the bright pixels are of interest, and when the RAM is being read, the blank lines can be skipped. Therefore, Microcontroller 108 must be able to read a Blank Line Flag telling it whether to skip reading a line or not. This flag must have been previously created while the line was written. Due to the high sampling rate in the digitizing process, it is quite difficult for Microcontroller 108 to create this flag, because it would have to fetch the pixel data to recognize it as bright pixel or background at the same time as the pixel data is being written to RAM 109. Instead of fetching the data on the fly, the Microcontroller lets a Flip-Flop 107 perform the task of detecting whether a scanned line is blank, and if it is the case, it marks the blank line in RAM 109 by writing a Blank Line Flag in the first RAM cell of this line. FIG. 6 shows the contents of RAM 109 after completion of this marking process, with a Blank Line Flag 120. Each horizontal band corresponds to one line of memory cell, and the white and grey areas correspond to bright pixels and blank data respectively. In order to write Blank Line Flags in this way, Flip-flop 107 is added to generate a flag with logical high voltage for a blank line and logical low voltage otherwise to the input port of Microcontroller 108. Flip-flop 107 has a trigger input from Spot Level Detector 105 and is reset by Hsync. FIG. 7 describes the operation of the system when the line is blank. The horizontal axis represents time progression from left to right and the bar at the top represents the output of Spot Level Detector 105 for one line. As time proceeds, the column address, which is the output of Address Counter 104, increases from 0 to Nh, and the image data is being written to RAM 109 corresponding to the address. Right after the end of the line, Microcontroller 108 checks the output of Flip-flop 107, which is set 'high' at the beginning of the line and stays 'high' since no bright pixels enter the trigger in this case. Then Microcontroller 108 points to address zero and overwrites a Blank Line Flag over the data of the first column during the scanning back period, lasting about 10 $\mu$s in NTSC, then goes to the next line. During the RAM reading phase, thanks to the Blank Line Flag, Microcontroller 108 is able to know if the line is blank or not just by just reading the first data rather than by scanning all the data on the line. On the other hand, FIG. 8 shows the process occurring when the line contains some bright pixels, represented by the white segment in the drawing. Although Flip-flop 107 is set 'high' and the column address counts up in the same way, the beginning of the bright pixel or the rising edge of the image triggers Flip-flop 107 to 'low'. Microcontroller 108 checks the flip-flop and does not write a Blank Line Flag to RAM 109 in this case.

By the process described above, all thresholded pixel data are stored in RAM and blank lines are marked as shown in FIG. 6. As a result, Microcontroller 108 can skip all the blank lines in the spot center detection process. This arrangement improves the system response to such an extent that it can provide updates of the 3D cursor on the computer display at the rate of the image fields (every 1/60 second), i.e. real time response to the motions of the pointing device.

Figure 9:
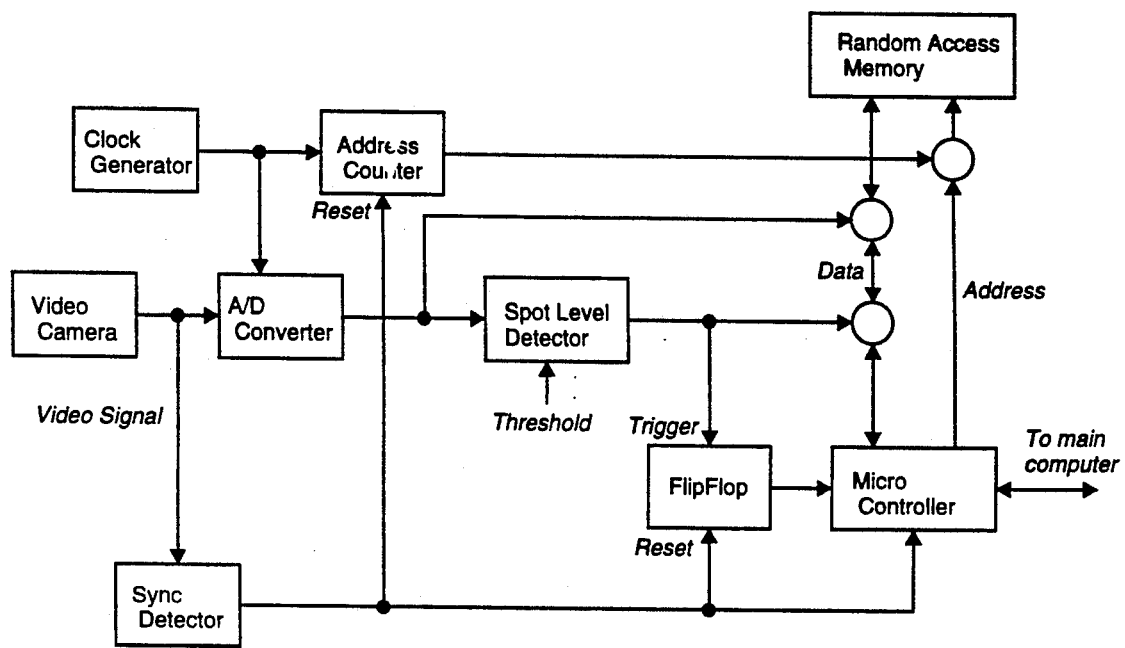
FIG. 9 is a diagram of a Spot Center Detecting Unit which can be switched to operate as a frame grabber.

A second embodiment of the spot center detecting apparatus is shown in FIG. 9. This embodiment shares most of its components with the previous example in FIG. 4. However, additional Data Bus Selector 112 on the data bus and a data line between A/D converter 102 and Spot Level Detector 105 to Data Bus Selector 112 are provided which can bypass Spot Level Detector 105. With this additional data line, the raw image data can be stored into RAM 109. This means that the user can use the circuitry either as a video frame grabber for general purposes, or as a dedicated spot center detecting unit for a 3D pointing device system. When the apparatus is used as a frame grabber, Microcontroller 108 enables Data Bus Selector 112 and disables Data Bus Selector 111 so that it can write/read the raw image data to/from RAM 109, and skip the flag writing process for blank lines. On the other hand, when it is used as the spot center detecting unit, Microcontroller 108 enables Data Bus Selector 111 and disables Data Bus Selector 112 so that the apparatus can act in exactly the same way as the one in FIG. 4.

Since the cost of RAM is relatively high compared to the cost of the other components, utilizing RAM for several functions yields a high performance/cost ratio. Moreover, by being given the ability to display a raw image data to a main computer, the user can make diagnostics of image processing problems, such as brightness threshold offset or lack of camera focus, and make the required calibration adjustments. This monitoring function makes the system more reliable and more convenient to the users.

Figure 10:
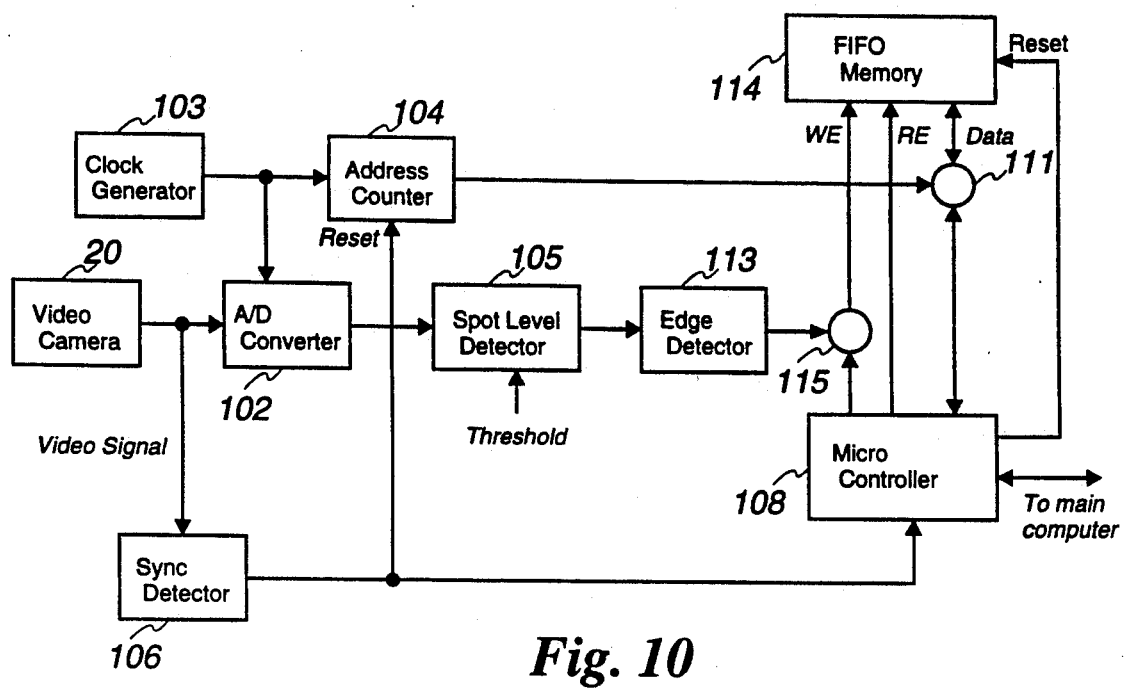
FIG. 10 is a diagram of a Spot Center Detecting Unit storing edge addresses for bright spots in a FIFO memory.

FIG. 10 shows a third embodiment of the spot center detecting apparatus. Although the previous embodiments made use of RAM for the storage of the image data, this embodiment uses a FIFO (First In First Out) Memory for storing the edge information of the spots. In FIG. 10, RAM 109 of FIG. 4 is replaced by FIFO Memory 114 which has no address input but has Write Enable (WE), Read Enable (RE) and Reset inputs for write/read operation. As its name indicates, the FIFO Memory writes data in order when WE is on, and reads the data in the same order as they were written when RE is on. Besides, at every write/read operation, the FIFO Memory increases its internal address counter one by one. The counter is reset to zero by the Reset input. Among other additional components, Edge Detector 113 is inserted after Spot Level Detector 105, and so is WE Selector 115 which selects WE pulses from either Edge detector 113 or Microcontroller 108. The output of Address Counter 104 is connected to Data Bus Selector 111. The reason is that the address itself is stored in memory.

Figure 11:
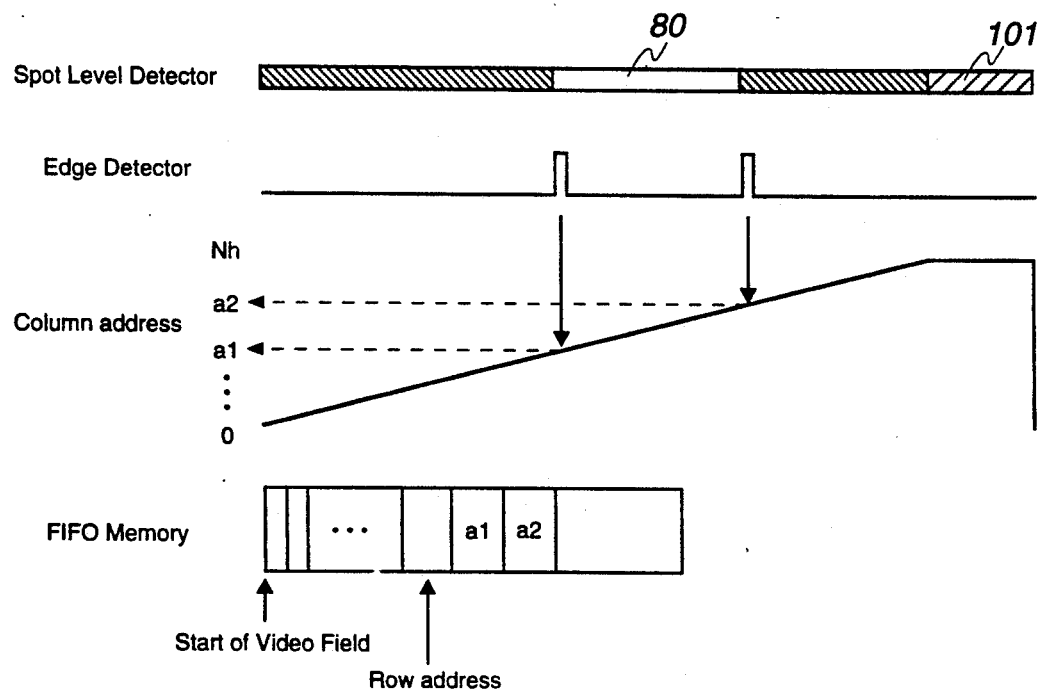
FIG. 11 explains how edge addresses are detected and stored in the FIFO.

FIG. 11 explains the operation of the apparatus of FIG. 10. The bar at the top represents the output of Spot Level Detector 105, where white and grey bands represent bright and dark pixels respectively. Edge detector 113 produces a pulse at the time of the transition between bright and dark pixels in the image. This edge pulse, via WE Selector 115, enables FIFO Memory 114 to write the data which is the column address coming from Address Counter 104 when the edge occurs, that is, $a_1$ and $a_2$, via Data Bus Selector 111. In FIFO Memory 114, data are written sequentially from the address zero, being shifted by the increment of the internal counter. Microcontroller 108 resets the address to zero at every beginning of the video field. The bottom of FIG. 11 shows the contents of FEFO Memory 114. In this example, we assume that Address Counter 104 generates only the column address; the row address is generated by Microcontroller 108 to specify the location of the edge. Afterwards, all the edge data are recalled by Microcontroller 108 via Data Bus Selector 111 with RE on. The microcontroller uses these edge data for computing the position of the center of the spot according to the operations described in great details in U.S. Pat. No. 5,227,985, which is hereby incorporated by reference.

Whether the row address should be stored or not actually depends on the processing power of Microcontroller 108. If the microcontroller is fast enough to read the data from the FIFO into its internal memory and complete the spot center computations during the scanning back periods, the row address is not needed. Then FIFO Memory 114 is used as a line buffer. Considering the small amount of data created by a single line, several simple shift registers can be used in combination as a FIFO Memory.

These uses of FIFO Memory 114 can improve the system's response by avoiding the requirement for memory scanning in non-blank lines and the requirement for an edge detecting routine. Besides, the capacity of FIFO Memory chip can be small since it does not have to store the whole image, therefore the circuitry of this embodiment can be less costly than the embodiments requiring RAM memory. Although the system loses its ability to double as a frame grabber, it is a good solution for a unit entirely dedicated to pose monitoring of an input device.

Figure 12:
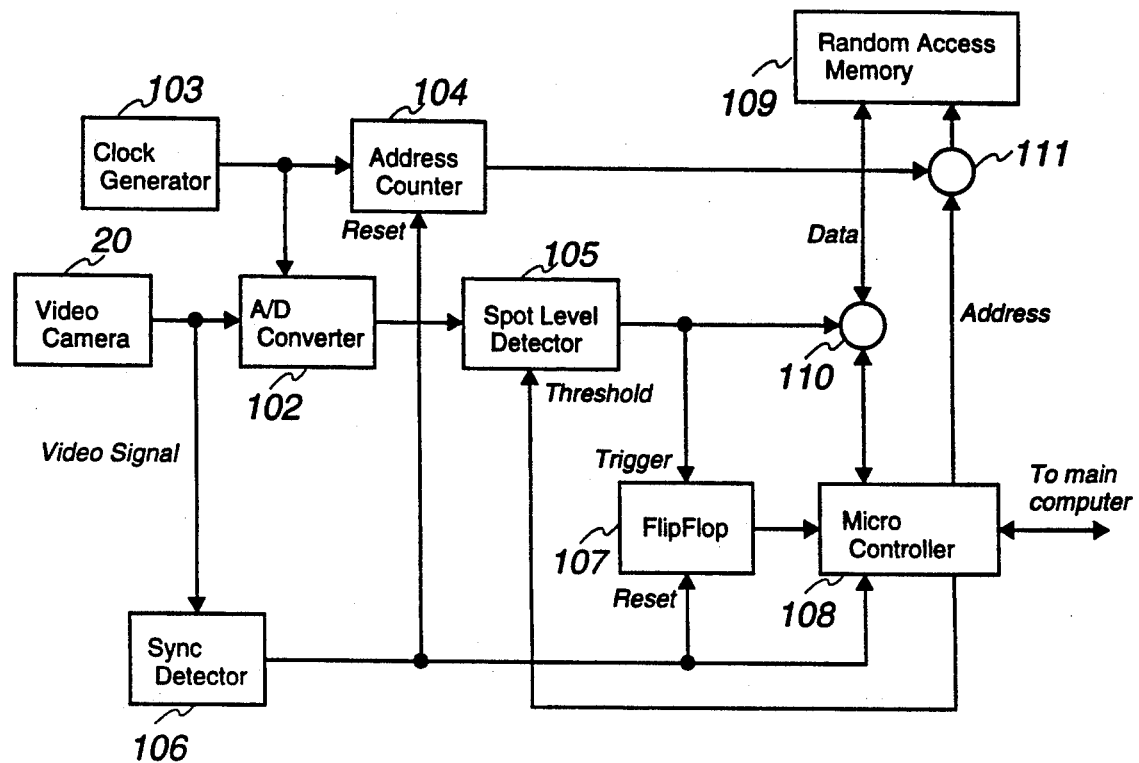
FIG. 12 is a diagram of a Spot Center Detecting Unit with an auto-calibration feature adjusting the threshold according to the number of bright pixels.
Figure 13:
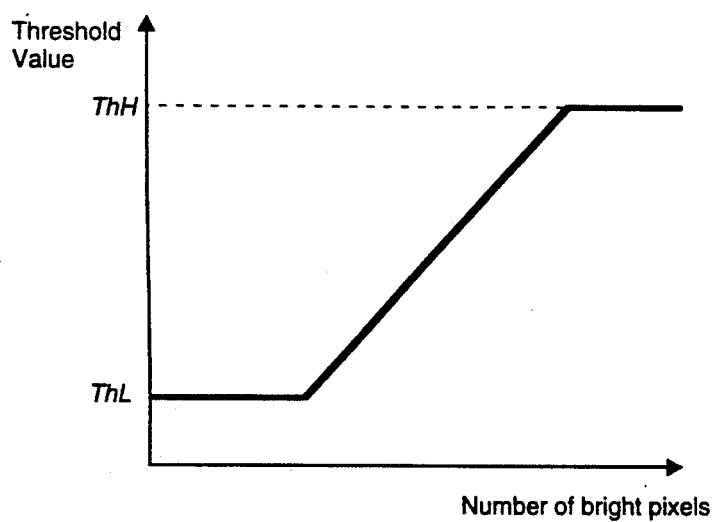
FIG. 13 shows how the threshold value can be adjusted in relation to the number of bright pixels.

FIG. 12 shows a fourth embodiment of the spot center detecting apparatus. This example comprises the same components as the first example in FIG. 4, but features a variable threshold in Spot Level Detector 105. Microcontroller 108 makes use of an additional output port which is connected to Spot Level Detector 105 in order to control the threshold value. One purpose of the variable threshold is to stabilize the number of pixels by a negative feedback loop. A variable threshold can prevent the complete disappearance of the bright spots when the fight sources are far from the camera. It can also prevent the occurrence of very large bright spots that have a high probability of overlapping when the light sources are close to the camera. Moreover, large spots reduce the number of blank lines and thereby increase the time required for grouping bright pixels and finding spot centers. The threshold value is a function of the number of bright pixels whose characteristics is shown in FIG. 13. If the number of bright pixels is large, Microcontroller 108 outputs a higher value, limited by a maximum value (ThH), which decreases the number of bright pixels; if the number of bright pixels is small, Microcontroller 108 outputs a small value. This feedback provides an automatic calibration for the threshold so that the users do not need to worry about precisely adjusting the brightness of the light sources.

The feedback control of the threshold can also be combined to the apparatus with FEFO Memory which was described in FIG. 10. Microcontroller 108 would be able to compute the number of bright pixels from the edge data and then give the same feedback to Spot Level Detector 105 in order to provide the automatic calibration of the threshold.

OTHER EMBODIMENTS

The hand held device shown in FIG. 2 can be reconfigured to allow attachment to other controlling body parts of an operator such as the head, legs or arms of an operator.

Instead of letting an operator control a virtual cursor on a computer display, the apparatus can be used to let an operator remotely control a robotic system by teleoperation.

Many other domains of technology can benefit from the fast and inexpensive remote detection of the motions of objects by the computer vision techniques allowed by this invention. Therefore, although the description above contains many specificities, these should not be construed as limiting the scope of this invention but as merely providing illustrations of some of the presently preferred embodiments of this invention. Thus the scope of this invention should be determined by the appended claims and their legal equivalents, rather than by the examples given.

We claims:

1. In an apparatus for monitoring the position and orientation of a rigid three-dimensional (3-D) object in space comprising:
   an electronic camera having a reference coordinate frame and producing an analog video signal, the analog video signal being composed of scanning lines, each scanning line corresponding to a single line of an image of the electronic camera;
   a plurality of light sources rigidly attached to the rigid 3-D object, these lights projecting bright spots onto the image of the camera;
   processing means for processing the analog video signal and determining a list of positions of the bright spots;

computing means including memory means, output means and display means;

the computing means including pose computing means for computing a translation vector and a rotation matrix of the rigid 3-D object in the reference coordinate frame of the electronic camera and transmitting these quantities to the output means; the output means modifying images on the display means;

the improvement comprising in the processing means:

a first electronic means for generating a timing signal synchronous to the beginning of the scanning line, a clock generator for producing a clock signal, a second electronic means for digitizing the scanning line into a string of digitized values, at the rate of the clock signal, thresholding means for thresholding the string of digitized values into a string of thresholded digitized values in which values higher than a given threshold value are set to a logical high value and values lower than a given brightness threshold value are set to a logical low value, a third electronic means for producing a flag signal which is set to a logical high value when all elements of the string of thresholded digitized values are set to a logical low value and which is reset by the synchronous timing signal, a counter driven by the clock signal and reset by the synchronous timing signal for generating address numbers, a second memory means for: i) storing strings of thresholded digitized values to memory cells addressed by the address numbers, and (ii) storing an additional data when the flag signal is set to a logical high value, and the processing means further including means for: i) recalling the strings of thresholded digitized values from the memory cells and skipping a string of thresholded digitized values when the additional data indicates that these digitized values are all set to a logical low value, ii) calculating from recalled strings of thresholded digitized values the positions of centers of the bright spots, and iii) computing the position and orientation of the object from the positions of the centers of the bright spots.

2. The improvement of the apparatus of claim 1, wherein the brightness threshold value is provided by the processing means.

3. The improvement of the apparatus of claim 1, further comprising a direct signal path between the second electronic means for digitizing the scanning lines and the second memory means, whereby the digitized video signal is stored into the second memory means without being subjected to the thresholding means.

4. The apparatus of claim 3, wherein the threshold value is provided by the processing means.

5. The improvement of the apparatus of claim 1, further comprising the light sources which are secondary light sources obtained by guiding light produced by a primary light source through optic fibers.

6. The apparatus of claim 5 wherein the means for attaching the light sources to the object is a hand held structure.

7. The apparatus of claim 5 wherein the device is battery powered.

8. The improvement of the apparatus of claim 1, wherein the display means includes control of a virtual cursor on the display means which is a part of a computer display, the computing means further including means for computing the virtual cursor at a position transformed from the translation vector of the light sources such that the virtual cursor is displayed in a vicinity of an edge of the computer display when the light sources are positioned in a vicinity of a boundary of a field of view of the camera, whereby the transformed position of the virtual cursor on the computer display provides visual feedback about the proximity of the light sources to the boundary of the field of view of the camera.

9. In an apparatus for monitoring the position and orientation of a rigid three-dimensional (3-D) object in space comprising:

an electronic camera having a reference coordinate frame and producing an analog video signal, the analog video signal being composed of scanning lines, each scanning line corresponding to a single line of an image of the electronic camera;

a plurality of light sources rigidly attached to the rigid 3-D object, these lights projecting bright spots onto the image of the camera;

processing means for processing the analog video signal and determining a list of positions of the bright spots;

computing means including memory means, output means and display means;

the computing means including pose computing means for computing a translation vector and a rotation matrix of the rigid 3-D object in the reference coordinate frame of the electronic camera and transmitting these quantities to the output means; the output means modifying images on the display means;

wherein the improvement comprising in the processing means:

a first electronic means for generating a timing signal synchronous to the beginning of the scanning line, a clock generator for producing a clock signal, a second electronic means for digitizing the scanning line into a string of digitized values, at the rate of the clock signal, thresholding means for thresholding the strings of digitized values into strings of thresholded digitized values in which the values higher than a given brightness threshold value are set to a logical high value and the values lower than a given threshold value are set to a logical low value, a third electronic means for producing an edge timing pulse corresponding to an occurrence of transition from a logical low value to a logical high value and from a logical high value to a logical low value in the strings of thresholded digitized values, a counter driven by the clock signal and reset by the synchronous signal for generating an address number, a second memory means for sequentially storing the address number at each occurrence of the edge timing pulse, the processing means further including means for: i) recalling each address number from the memory means and for calculating from all the address numbers the positions of centers of the bright spots, and ii) computing the position and orientation of the object from the positions of centers of the bright spots, and iii) controlling the brightness threshold value.

10. The improvement of the apparatus of claim 9, wherein the display means includes control of a virtual cursor on the display means which is a part of a computer display, the computing means further including means for computing the virtual cursor at a position transformed from the translation vector of the light sources such that the virtual cursor is displayed in a vicinity of an edge of the computer display when the light sources are positioned in a vicinity of a boundary of a field of view of the camera, whereby the transformed position of the virtual cursor on the computer display provides visual feedback about the proximity of the light sources to the boundary of the field of view of the camera.

11. The improvement of the apparatus of claim 9, further comprising the light sources which are secondary light sources obtained by guiding light produced by a primary light source through optic fibers.

12. The apparatus of claim 9 wherein the means for attaching the light sources to the object is a hand held structure.

13. The apparatus of claim 9 wherein the device is battery powered.

* * * * *